United States Patent
Chen et al.

(10) Patent No.: US 7,053,685 B2
(45) Date of Patent: *May 30, 2006

(54) FREQUENCY SIGNAL ENABLING APPARATUS AND METHOD THEREOF

(75) Inventors: Chie Yeon Chen, Hsinchu (TW); Chuang Huang Kuo, Yi-Lan Hsien (TW)

(73) Assignee: Winbond Electronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/194,828

(22) Filed: Aug. 1, 2005

(65) Prior Publication Data

US 2005/0264332 A1    Dec. 1, 2005

Related U.S. Application Data

(63) Continuation of application No. 10/252,780, filed on Sep. 23, 2002, now Pat. No. 6,940,326.

(30) Foreign Application Priority Data

Dec. 31, 2001    (TW) .............................. 90133493 A

(51) Int. Cl.
*H03K 5/01* (2006.01)

(52) U.S. Cl. .................. 327/166; 327/165; 327/34; 327/37

(58) Field of Classification Search .................. 327/165, 327/166, 172–176, 34, 35, 37, 38, 217, 291, 327/293–299, 551, 558, 18–21, 261, 292; 326/93, 94

See application file for complete search history.

(56) References Cited

U.S. PATENT DOCUMENTS

| | | | |
|---|---|---|---|
| 4,227,251 A | 10/1980 | Kazama et al. | 375/360 |
| 4,525,635 A | 6/1985 | Gillberg | 327/34 |
| 5,001,374 A * | 3/1991 | Chang | 327/552 |
| 5,059,818 A | 10/1991 | Witt et al. | 327/175 |
| 5,166,631 A | 11/1992 | Kyrian et al. | 327/166 |
| 5,225,715 A * | 7/1993 | Mori et al. | 327/34 |
| 5,254,960 A | 10/1993 | Hikichi | 331/46 |
| 5,418,486 A * | 5/1995 | Callahan | 327/310 |
| 5,521,550 A | 5/1996 | Doak | 330/10 |
| 5,539,337 A | 7/1996 | Taylor et al. | 326/94 |
| 5,572,149 A | 11/1996 | Fujii | 326/93 |
| 5,572,549 A | 11/1996 | Shimomura et al. | 375/285 |
| 5,638,016 A | 6/1997 | Eitrheim | 327/175 |
| 6,320,437 B1 * | 11/2001 | Ma | 327/175 |
| 6,535,024 B1 | 3/2003 | Rochard | 327/34 |
| 6,621,359 B1 * | 9/2003 | Lee et al. | 331/57 |
| 6,940,326 B1 * | 9/2005 | Chen et al. | 327/166 |

* cited by examiner

*Primary Examiner*—Timothy P. Callahan
*Assistant Examiner*—Hai L. Nguyen
(74) *Attorney, Agent, or Firm*—Ladas and Parry LLP

(57) ABSTRACT

The present invention discloses a frequency signal enabling apparatus and the method thereof for filtering noises and glitch when entering an operating mode from a power-saving mode. When the pulse width of the input frequency signal is smaller than the threshold pulse width, it will be considered as a noise and be filtered out. When the high-level pulse width of the input frequency signal is greater than the threshold, a first short pulse will be generated. When the low-level pulse width of the input frequency signal is greater than the threshold, a second short pulse will be generated. The relative position of the first short pulse and the second short pulse will be used to reconstruct the frequency signal, and the reconstructed frequency signal may serve as the operating frequency of the microprocessor or other digital IC.

12 Claims, 3 Drawing Sheets

FREQUENCY SIGNAL ENABLING APPARATUS AND METHOD THEREOF

This is a continuation of application Ser. No. 10/252,780 filed on Sep. 23, 2002, now U.S. Pat. No. 6,940,326 B2, claims the benefit thereof and incorporates the same by reference.

BACKGROUND OF THE INVENTION

1. Field of the Invention

The present invention relates to a frequency signal enabling apparatus and the method thereof, and more particularly, to a frequency signal enabling apparatus and the method capable of filtering noise and fast enabling the digital IC when transferred from a power-saving mode into an operating mode.

2. Description of Related Art

Due to the current trend of electronic product for lighter, slimmer and portability, how to enhance the power-saving function has become the development focus for various manufacturers. The conventional power-saving function turns off the input frequency signal (XTAL) of the microprocessor after the microprocessor enters a power-saving mode from an operating mode; and while the microprocessor returns to the operating mode from the power-saving mode, the input frequency signal is turned on. While the input frequency signal was turned on from off, the aforementioned power-saving function will generate a transient noise signal. The microprocessor must wait a period of time to proceed with operating until the input frequency signal became stable. Otherwise, if the microprocessor begins to operate while the input frequency signal was not yet stable, it is easy to crash or calculate with the wrong results.

A conventional manner for solving aforementioned problem uses a counter circuit. First, the circuit designer sets a safe count value that when the counter counts from zero to the said count value, it means the input frequency signal is stable, then the microprocessor is enabled to proceed with operating.

The drawback of the conventional manner is that a large chip area is wasted. Especially for some light, slim electronic products, the chip with too large area is against the design rule. Thus, for the industry, it is necessary to provide an effective solution to avoid producing an error operation while the microprocessor or other digital IC returns the operating mode from the power-saving mode.

SUMMARY OF THE INVENTION

The first object of the invention is to provide a frequency signal enabling apparatus, which occupies less area.

The second object of the invention is to provide a frequency signal enabling apparatus and the method thereof, which may start rapidly after the IC entering into an operating mode from a power-saving mode.

The third object of the invention is to provide a frequency signal enabling apparatus and the method thereof, which is capable of filtering noises and glitch.

To achieve the aforementioned objects, the invention proceeds with noise filtering for frequency signal immediately after the IC entering into the operating mode from the power-saving mode. When the pulse width of the input frequency signal is smaller than the threshold pulse width, it will be considered as a noise and be filtered out. When the high-level pulse width of the input frequency signal is greater than the threshold, a first short pulse will be generated. When the low-level pulse width of the input frequency signal is greater than the threshold, a second short pulse will be generated. The relative position of the first short pulse and the second short pulse will be used to reconstruct the frequency signal, and the reconstructed frequency signal may serve as the operating frequency of the microprocessor or other digital IC.

BRIEF DESCRIPTION OF THE DRAWINGS

The present invention will be described according to the appended drawings in which.

DESCRIPTION OF PREFERRED EMBODIMENTS

Figure 1:
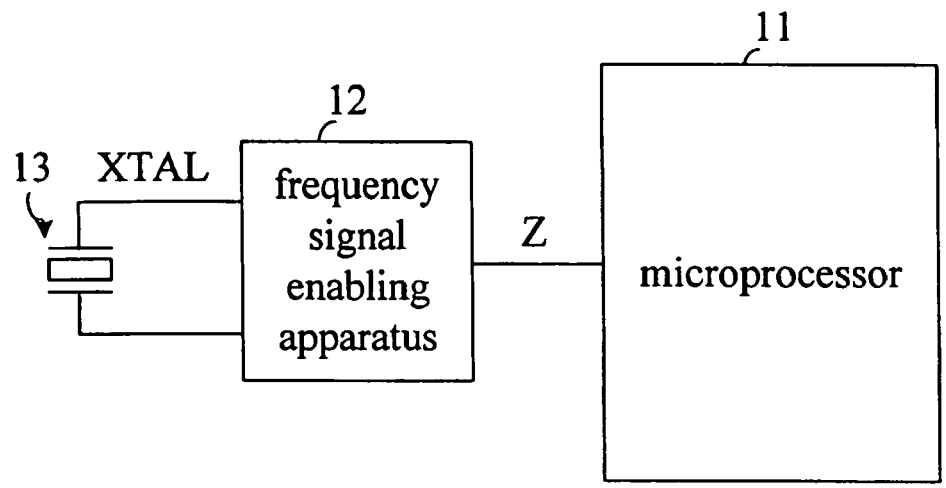
FIG. 1 shows a system diagram of a frequency signal enabling apparatus according to the present invention.

FIG. 1 is the system schematic view of the frequency signal enabling apparatus 12 of the invention. The frequency signal enabling apparatus 12 receives a frequency signal XTAL generated by a frequency oscillator 13, and eliminates the noise of the frequency signal XTAL to further generate a stable frequency signal Z for the microprocessor 11. When the microprocessor 11 enters into a power-saving mode from an operating mode, the input frequency signal XTAL will be turned off. When the microprocessor returns from power-saving mode to operating mode, the input frequency signal XTAL will be turned on. What is different from the prior art is that the frequency signal enabling apparatus 12 may convert the unstable frequency signal into a stable frequency signal in real-time for the microprocessor 11. In other words, the frequency signal enabling apparatus 12 of the invention may avoid the drawback in prior art that while returning from the power-saving mode to the operating mode, the microprocessor 11 must wait a period of time to proceed with operating. Furthermore, the number of transistors necessary for the frequency signal enabling apparatus 12 of the invention is less than that of the counter circuit in prior art, that is the chip area occupied by the frequency signal enabling apparatus 12 of the invention is smaller, thereby it is more suitable for the lighter, slimmer electronic products.

The system diagram shown in FIG. 1 is only one embodiment of the invention. In practical application, the frequency signal enabling apparatus 12 may also be embedded into the microprocessor 11 to reduce the manufacturing cost.

Figure 2:
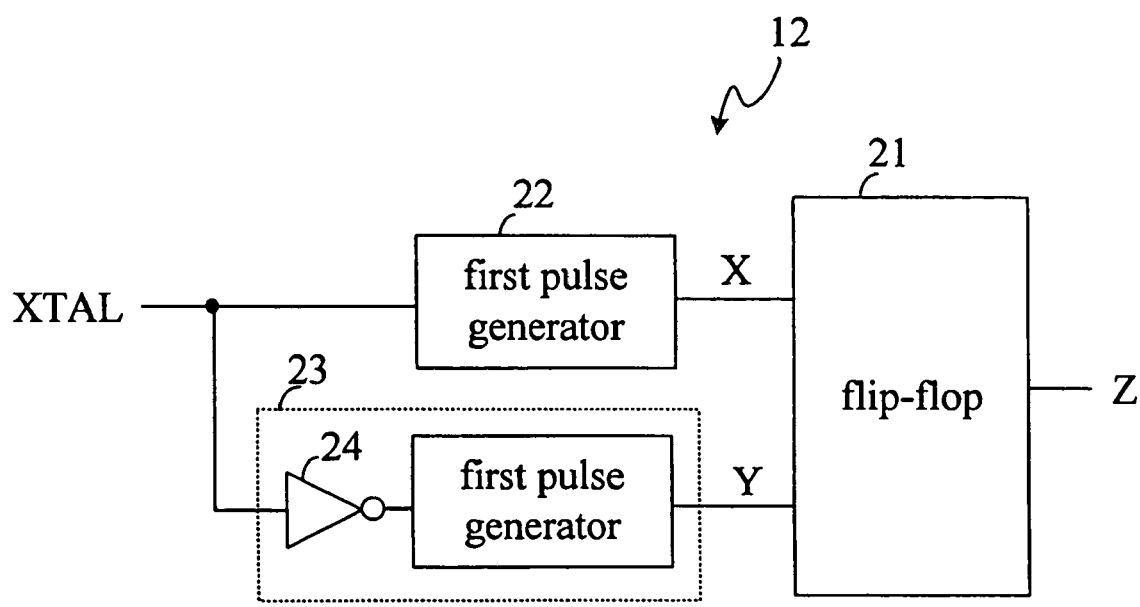
FIG. 2 shows a circuit module of a frequency signal enabling apparatus according to the present invention.

FIG. 2 shows the circuit block diagram of the frequency signal enabling apparatus of the invention, which mainly includes a first clock generator 22, a second clock generator 23 and a flip-flop 21. The circuit designer may preset a threshold pulse width that when the pulse width of the input frequency signal XTAL is smaller than the threshold, it will be considered as a noise and be filtered out. When the high-level pulse width of the input frequency signal XTAL is greater than the threshold, a first short pulse will be generated by the first clock generator 22. When the low-level pulse width of the input frequency signal XTAL is greater than the threshold, a second short pulse will be generated by the second clock generator 23. The second clock generator 23 may be constituted from a NOT gate 24 connecting with a first pulse generator 22 in series. The output terminals of the first pulse generator 22 and the second pulse generator 23 are connected to the flip-flop 21. The flip-flop 21 starts with the first short pulse outputted from the first pulse generator 22, and ends with the second short pulse outputted from the second pulse generator 23 so as to reconstruct a frequency signal Z with complete waveform. The flip-flop 21 may be the conventional RS flip-flop or of other types, which are not confined in the invention.

Figure 3:
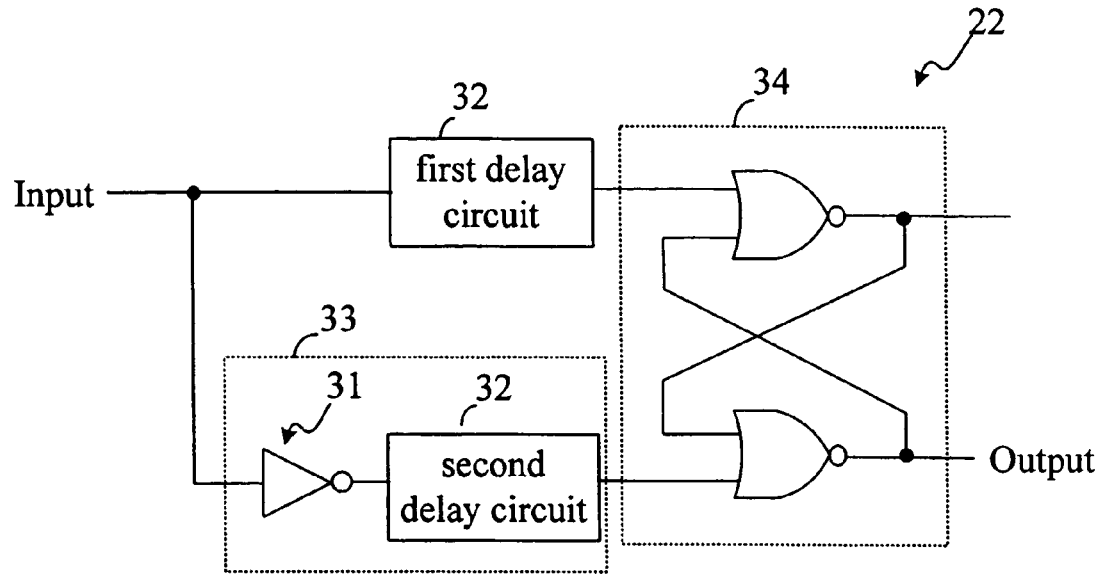
FIG. 3 shows a circuit diagram of a first pulse generator according to the present invention.

FIG. 3 shows the circuit diagram of the first pulse generator 22 of the invention. The output terminal of the first pulse generator 22 is a flip-flop 34, such as a RS flip-flop. One input terminal of the flip-flop 34 is a first delay circuit 32, which may be formed by connecting a plurality of inverter in series in the design. The circuit designer may set the delay period of the first delay circuit 32 in order to generate a corresponding threshold pulse width. Another input terminal of the flip-flop 34 is a second delay circuit 33, which may be constituted from the series combination of the delay circuit 32 and a NOT gate 31, that the delay period may be set close to that of the first delay circuit 32.

Figure 4:
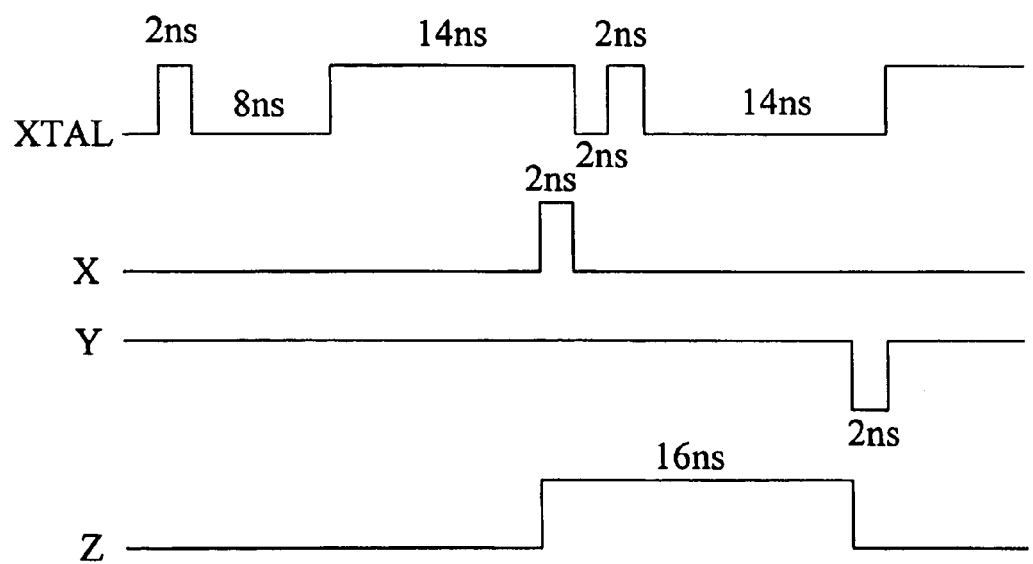
FIG. 4 shows a timing diagram of a frequency signal enabling apparatus according to the present invention.

FIG. 4 shows the timing diagram of the frequency signal enabling apparatus of the invention. In FIG. 4, an input frequency signal XTAL has some noise and glitch on the high-level and low-level pulses, respectively. If the circuit designer sets the threshold pulse width at 12 ns, the input frequency signal XTAL with pulse widths at 2 ns and 8 ns will be filtered out. The input frequency signal XTAL with pulse width at 14 ns on the high-level and the low-level will be detected by the first pulse generator 22 and the second pulse generator 23, respectively, and the corresponding first short pulse and second short pulse will be generated. The flip-flop 21 starts with the first short pulse, and ends with the second short pulse, and reconstructs a frequency signal with complete waveform.

Figure 5:
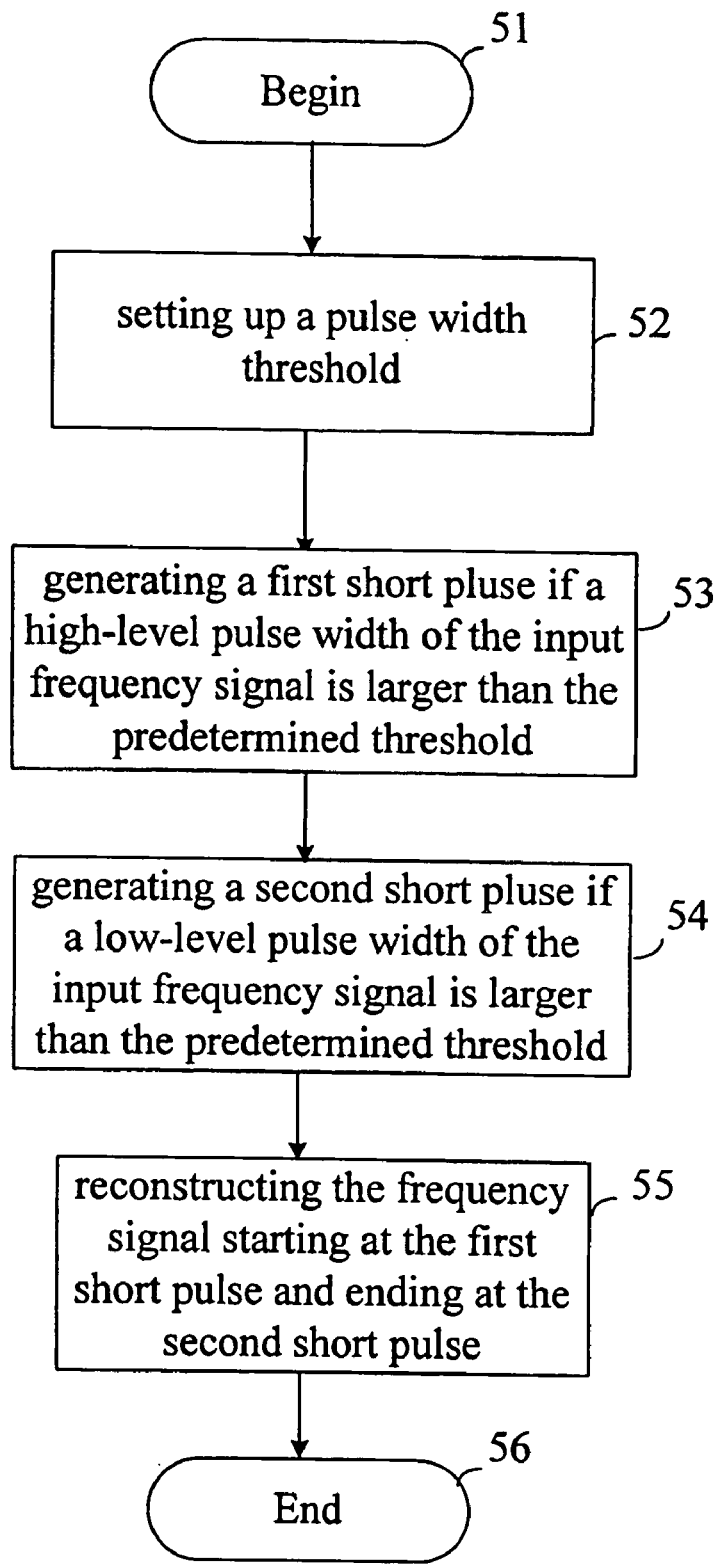
FIG. 5 shows a flow chart of a frequency signal enabling apparatus according to the present invention.

FIG. 5 shows the flow chart of the frequency signal enabling method of the invention. In step 51, the invention is started. In step 52, the circuit designer presets a threshold pulse width. When the pulse width of the input frequency signal is smaller than the threshold pulse width, it will be considered as a noise and be filtered out. When the pulse width of the input frequency signal is greater than the threshold pulse width, the pulse may be reconstructed by the following steps. In step 53, when the high-level pulse width of the input frequency signal is greater than the threshold, a first short pulse will be generated. In step 54, when the low-level pulse width of the input frequency signal is greater than the threshold, a second short pulse is generated. In step 55, starting with the first short pulse and ending with the said second short pulse, that a frequency signal is reconstructed. The reconstructed frequency signal may serve as the operating frequency of the microprocessor or other digital IC so as to avoid the waiting period for stable frequency while entering operating mode from power-saving mode. In step 56, the invention is ended.

The described embodiment starts with the first short pulse and ends with the second short pulse to reconstruct the frequency signal. However, in practical application, it may start with the second short pulse and ends with the first short pulse to reconstruct the frequency signal, or using other similar methods, which are not confined in the invention.

The above-described embodiments of the present invention are intended to be illustrative only. Numerous alternative embodiments may be devised by those skilled in the art without departing from the scope of the following claims.

What is claimed is:

1. A frequency signal filtering apparatus, comprising:
   a first pulse generator, generating a first short pulse if a high-level pulse width of said input frequency signal is greater than said predetermined threshold pulse width;
   a second pulse generator, generating a second short pulse if a low-level pulse width of said input frequency signal is greater than said predetermined threshold pulse width; and
   a frequency reconstruction circuit receiving said first short pulse and said second short pulse to reconstruct said frequency signal.

2. The frequency signal filtering apparatus of claim 1, wherein said second pulse generator includes a NOT gate and another first pulse generator connected to said NOT gate in series.

3. The frequency signal filtering apparatus of claim 1, wherein said frequency reconstruction circuit includes a RS flip-flop.

4. The frequency signal filtering apparatus of claim 1, wherein said frequency reconstruction circuit reconstruct said frequency signal starting at said first short pulse and ending at said second short pulse.

5. The frequency signal filtering apparatus of claim 1, wherein said frequency reconstruction circuit reconstruct said frequency signal starting at said second short pulse and ending at said first short pulse.

6. The frequency signal filtering apparatus of claim 1, wherein said first pulse generator comprises:
   a first delay circuit for generating a delay signal, and a delay time of said delay signal being directly proportional to a value of said predetermined threshold pulse width;
   a second delay circuit for generating a contrary signal to said signal generated by said first delay circuit; and
   a flip-flop connected to said first delay circuit and said second delay circuit, and said flip-flop generating said first short pulse if a high-level pulse width of said input frequency signal is greater than said predetermined threshold pulse width.

7. The frequency signal filtering apparatus of claim 6, wherein said flip-flop is a RS flip-flop.

8. The frequency signal filtering apparatus of claim 1, wherein said second pulse generator comprises:
   a first delay circuit for generating a delay signal, and a delay time of said delay signal being directly proportional to a value of said predetermined threshold pulse width;
   a second delay circuit for generating a contrary signal to said signal generated by said first delay circuit; and
   a flip-flop connected to said first delay circuit and said second delay circuit, and said flip-flop generating said second short pulse if a low-level pulse width of said input frequency signals is greater than said predetermined threshold pulse width.

9. The frequency signal filtering apparatus of claim 8, wherein said flip-flop is a RS flip-flop.

10. A frequency signal filtering method, comprising the steps of:
    setting up a threshold pulse width;
    generating a first short pulse if a high-level pulse width of said input frequency signal is greater than said predetermined threshold pulse width;
    generating a second short pulse if a low-level pulse width of said input frequency signal is greater than said predetermined threshold pulse width; and
    reconstructing said frequency signal depending on positions of said first short pulse and said second short pulse.

11. The frequency signal filtering method of claim 10, wherein said frequency signal starts at said first short pulse and ends at said second short pulse.

12. The frequency signal filtering method of claim 10, wherein said frequency signal starts at said second short pulse and ends at said first short pulse.

* * * * *